Sept. 3, 1929.  H. A. BORRESEN  1,726,643
INCLINATION INDICATOR
Original Filed April 4, 1918    3 Sheets—Sheet 1
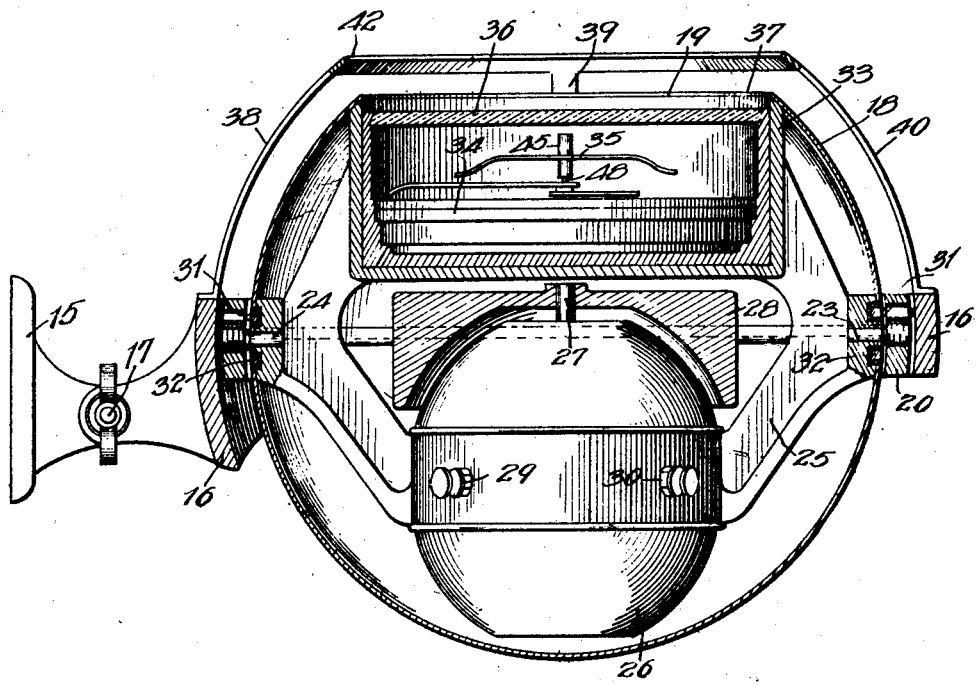
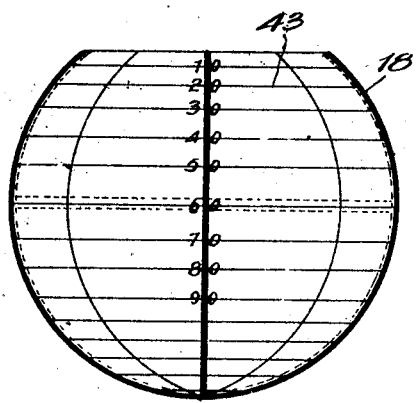

Sept. 3, 1929. H. A. BORRESEN 1,726,643
INCLINATION INDICATOR
Original Filed April 4, 1918   3 Sheets-Sheet 2
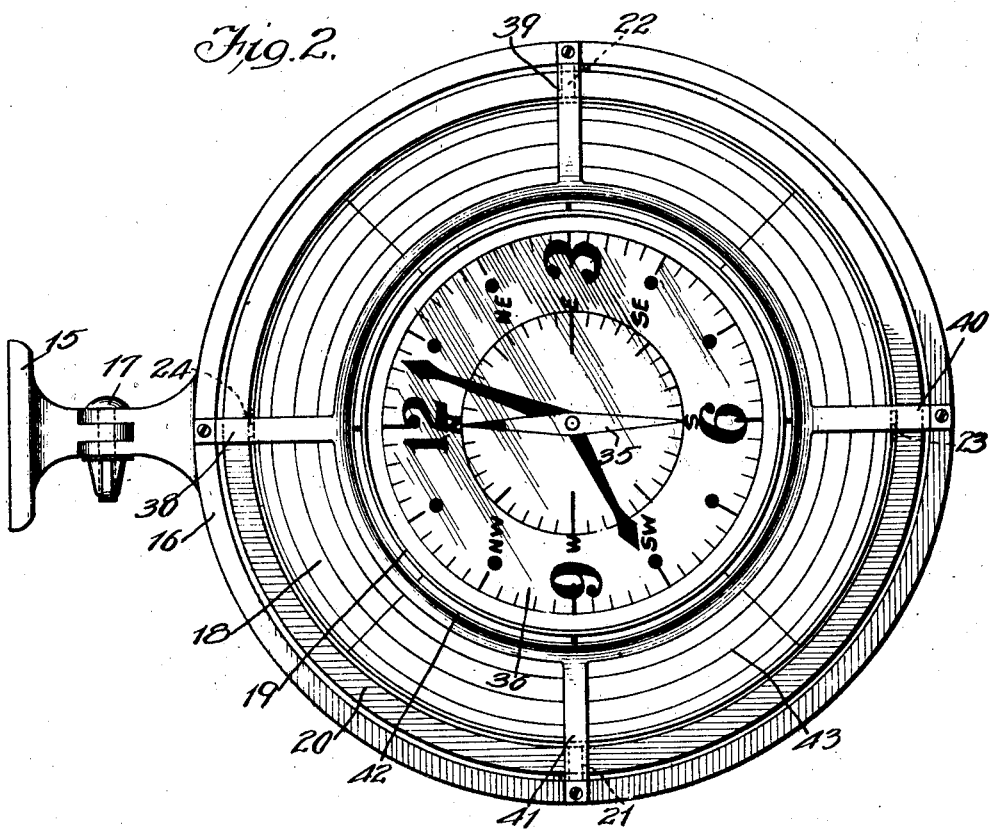
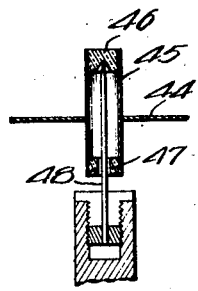
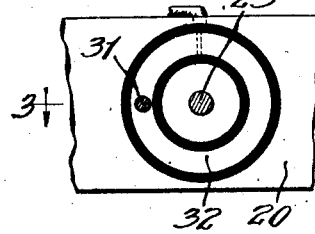
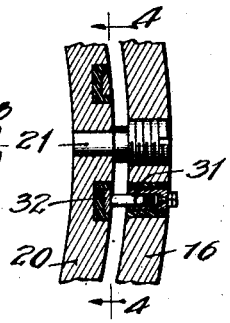

Sept. 3, 1929.   H. A. BORRESEN   1,726,643
INCLINATION INDICATOR
Original Filed April 4, 1918   3 Sheets-Sheet 3
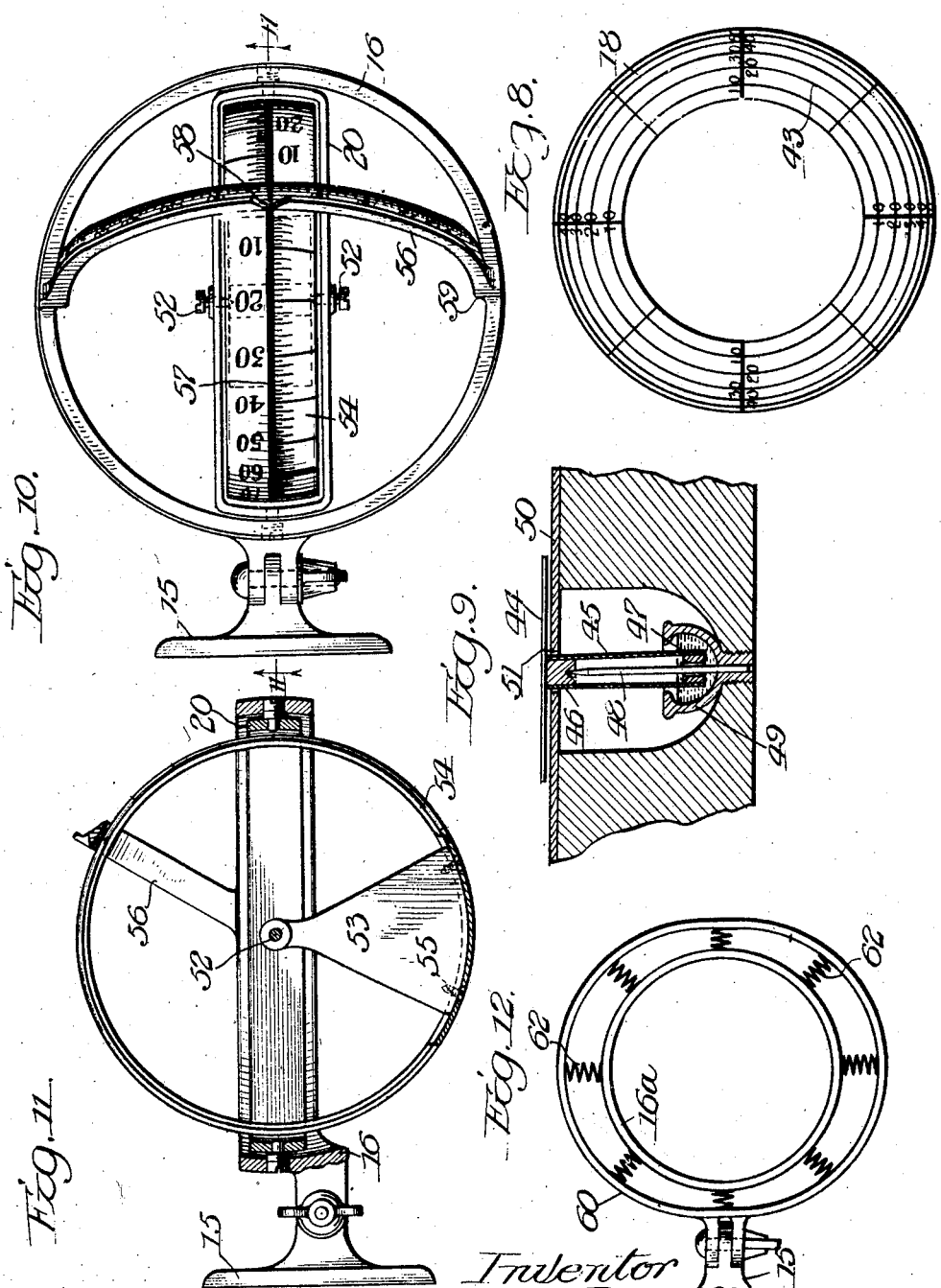

Patented Sept. 3, 1929.

1,726,643

UNITED STATES PATENT OFFICE.

HELGE A. BORRESEN, OF CHICAGO, ILLINOIS.

INCLINATION INDICATOR.

Application filed April 4, 1918, Serial No. 226,722. Renewed August 5, 1925.

My invention relates to self leveling means which may maintain substantially a given predetermined position regardless of the movements or inclinations of the platform or support upon which they may be carried.

The improved means of my invention lend themselves more particularly for use upon such devices as aeroplanes, ships, submarines, or the like, or in fact any other unstable platform upon which they may be used. My improved means in such or similar uses are well adapted to indicate the declination or inclination in one plane as well as spherically of the platform or other device whose deviation from a given position it may be desired to ascertain.

Further, the means are well adapted to support in a given position such devices as compasses, watches, or like instruments, regardless of the shifting character of the platform whereon the means are supported.

In one form which my invention may take, I may use it for indicating spherically the deviation of an aeroplane or submarine from its normal level position. Furthermore, the means may support, as stated, a watch or compass or similar device in a level or any predetermined position upon such devices as aeroplanes, hydroplanes or submarines, etc.

It is a prime object of my invention to so arrange these means that they may be substantially uninfluenced by centrifugal or other disturbing forces tending to destroy the given predetermined position which the means are designed to maintain.

The specific form of the means disclosed herein for nullifying the disturbing centrifugal forces comprises gyroscopic mechanism suitably permanently driven and overbalanced to a sufficient degree to permit the means normally to assume a given definite position under the influence of the force of gravitation. This over-balancing also serves to self-align the means of my invention should the same when in operation become slightly displaced from the normal level position which the means is designed to occupy.

This particular specific form of the invention as illustrative of its general character I will now describe in detail in connection with the accompanying drawings, in which Fig. 1 is a vertical sectional view of an instrument constructed in accordance with my invention;

Fig. 2 is a top view thereof;

Fig. 3 is a fragmentary sectional view of the pivotal mounting structure and contactor;

Fig. 4 is a sectional view on line 4—4 of Fig. 3;

Fig. 5 is a sectional view of the mounting of the magnetic needle employed;

Fig. 6 is a diagrammatic view illustrating the circuit connections;

Fig. 7 is a view of the enclosing shell of the device showing graduations thereon;

Fig. 8 is a top view of the structure illustrated in Fig. 7;

Fig. 9 is a modified form of neelle mounting;

Fig. 10 shows a mechanism to illustrate a modified form of indicating system;

Fig. 11 is a sectional view on line 11—11 of Fig. 10, and

Fig. 12 is a plan view of a resilient support for gimbal bearing frames.

Referring more specifically to Figs. 1 and 2, I show a supporting backet 15 adjustably carrying a supporting ring 16, the adjustment being effected through the agency of the bolt 17. This ring 16 by means of mountings presently to be described supports the spherical shell 18 in a manner to permit said shell to universally adjust itself into a level predetermined position regardless of the angular position occupied by the ring 16.

It is assumed, for instance, that this device may be mounted on an aeroplane wherein the bracket 15 is rigidly supported upon the aeroplane framework. The ring 16 with its supporting bracket 15 may thereupon occupy any position relative to the horizontal depending upon the position occupied by the aeroplane. The shell 18 will adjust itself so that its upper surface 19 remains level. This universal mounting is effected by means of gimbal bearings and to this end an intermediate ring 20 is employed, which ring is rotatably held in the ring 16 by the pivots 21 and 22. The ring 20 in its turn pivotally supports the shell 18 through the agency of the pivots 23 and 24. These two sets of pivots, as noted, are preferably in a plane and extend at right angles to each other. By this form of gimbal bearing, as well understood, the shell 18 can adjust itself universally with respect to the ring 16. The shell 18 is fixedly secured to a yoke 25, which yoke supports preferably an electric motor 26. This electric motor has a shaft 27 carrying a flywheel 28. The current is conducted to the motor through any suitable means like brushes and contact rings, finally reaching the terminals 29 and 30 of the motor. The form of current conducting means at the bearings which I employ is shown more clearly in Figs. 3 and 4, in which the ring 20 is provided with a spring pressed brush 31, engaging an insulated connecting ring 32 carried upon the plate rotatably connected therewith through the agency of the spindle 23. The yoke 25 likewise carries an instrument case 33 which may be of magnetic material, if desired, to form a magnetic shell for the instruments contained therein, this instrument case 33 supporting a watch 34 and a compass 35, all suitably surmounted by a glass cover 36. The shell 18 has an open mouth as shown at 37 so that each indication of the watch and compass needle may be seen. The ring 16 likewise carries four upwardly extending arms 38, 39, 40 and 41, these arms being surmounted by a ring 42. The shell 18 is provided with graduation marks or lines 43, as shown more clearly in Figs. 7 and 8, which are suitably numbered in degrees so that the deviation or declination in any direction of the shell 18 relatively to the ring 16 may be suitably read by the observer in conjunction with the ring 42. When the ring 16 is in a level position, the open mouth 37 of the shell 18 is concentric with the ring 42 and the declination of course reads zero. When the ring 16 is moved, however, then the open mouth of the shell 18 is shifted relatively to the ring 42 and the degree of this shifting can readily be read by the observer who notes the position of the ring 42 relatively to the graduation marks upon the shell 18.

In order to prevent fluctuations of the shell 18 from its horizontal position when the ring 16 is moved in a jerky motion, or when the ring 16 is moved in a circular motion, or likewise when the ring 16 changes its rate of motion with a marked acceleration or retardation, I utilize the gyroscopic action of the rotatable weight or fly wheel 28. The shell 18 and the apparatus it contains are so arranged that the center of gravity thereof is a proper amount below the axis of the spindles 23 and 24 so that the force of gravitation normally maintains the open mouth 37 in a horizontal plane.

When the device upon which my improved means are mounted is called upon to assume different inclined positions, the motor 26 is started and operated to continuously rotate the fly wheel 28. The rotating weight 28 has the necessary gyroscopic effects to prevent the fluctuations due to peculiar changes in the direction of motion of the ring 16 as previously alluded to. I have illustrated the rotating weight 28 disposed above the motor, but this element may be for convenience in mounting instruments or reading registers advantageously be disposed otherwise. Should the peculiar changes of direction or speed of motion of the ring 16 be such as to overcome the gyroscopic effect of the weight and to tilt the shell 18 slightly out of its level position, the shell will then gradually tend to assume its level position by reason of the fact that the center of gravity of the shell is below the axis of the spindles 23 and 24, as stated.

In the structure shown in Figs. 1 and 2, there is intended a substantial surplus of weight below the axis above referred to to accomplish this desirable result.

By referring more particularly to Fig. 6, I show diagrammatically the circuit as it extends through the various brushes and contact segments to the motor 26.

In Fig. 5, I show the magnetic needle 44 as mounted upon a cylindrical shell 45, which shell carries in its upper extremity a jewel bearing 46. A further annular jewel bearing 47 is contained in the lower part of the shell 45. A suitably rigidly supported spindle 48 carries the compass needle and the above mentioned associated parts. The tip of the spindle is seated in the recess provided in the jewel bearing 46 and the annular jewel bearing 47 surrounds the spindle without touching it. In this way a frictionless bearing is provided for the needle 44 so as to prevent the needle 44 from swinging away from support 48 and thereby maintaining it in the desired horizontal plane and also in an accurate alignment with the dial.

In Fig. 9, I show the compass needle 44 together with its attached cylindrical shell 45 and jewel bearings 46 and 47 as again supported upon a spindle 48, but this spindle projects upwardly from an oil cup 49. The lower portion of the cylindrical shell 45 is partially submerged in oil to provide ample lubrication and to relieve the pressure somewhat on top of the spindle 48 due to a partial floating of the needle 44 and its associated parts. The arrangement of the needle and its associated parts is such that the needle may operate immediately above the dial 50 by reason of the fact that the associated parts hold the needle in close definite alignment, yet permitting practically frictionless rotation. I have shown only the compass needle associated with my structure, but the structure is equally useful in combination with the usual rotating compass disk.

In Figs. 10 and 11, I have omitted illustrating the gyroscopic elements and simply show the bracket 15 as again supporting a ring 16, this ring in turn pivotally holding the internal annular band 20. The annular band 20 carries spindles 52 which support the weight 53, to which weight the ring 54 is fastened by means of the screws 55. The ring 54 is thus also capable of a universal adjustment relative to the ring 16. The ring 16 is also provided with a bridge 56 provided with graduations, as more clearly apparent from Fig. 10. The ring 54 is also provided with graduations on its periphery readable in degrees. It will be most apparent that by means of the graduations upon the bridge 56 and the graduations upon the ring 54 the angular inclination of the ring 54 in two planes relatively to the ring 16 may be readily obtained, thus giving what is in effect a reading of the spherical displacement between the elements 16 and 54.

The ring 54 has a heavy line 57 thereon which extends around its periphery and which in co-operation with the notched sight 58 provided upon the bridge 56 may serve as a guide to the observer to maintain an aligned position, and which may be of service for instance to an aviator when looping the loop.

A desirable feature of this structure as shown in Figs. 10 and 11 is due to the fact that the spindles 52 are radially displaced nearer the center point of the device, so that the rings 20 and 54 may be flattened, thus increasing the facility with which the indications of the instrument may be read. It may be further noted that on account of this flattening of these inner elements of the structure the bridge 56 may be drawn inwardly as shown at 59, thereby placing the two reading registers very closely together so as to facilitate accuracy in readings, as may the facing of the bridge 56 at desirable visual angles as shown.

The indicating parts of the instrument may of course be made luminous as may be found desirable in order to aid reading at night or when the visibility is low. Any suitable color schemes and marks upon the reading registers may serve to emphasize danger zones, and in that way aid the operator to avoid dangerous accidents.

In Fig. 12 I show a structure for yieldingly supporting my improved device so that unusual jars may be compensated for and not injuriously influence its position. Thus the instrument is free from such influences. The structure herein disclosed includes in one of its forms a ring 60 which is mounted upon bracket 15, this ring supporting the ring 16ª which is the counter-part of the ring 16 shown in Fig. 11. In order to compensate for the jars I introduce springs 62, 62 between the rings 60 and 16ª. In order to more perfectly compensate for the jars it may be desirable to lengthen the springs along one axis so that they will be longer than the springs at an axis at right angles thereto. This can be easily arranged by having the ring 16 circular, and having the ring 60 elliptical or elongated as shown.

I claim:

1. A device of the character described comprising a spherical shell, a gyroscopic element mounted therein having a weighted portion and having its spin axis vertical, a support, means for universally and pendulously mounting said spherical shell on said support, there being graduations provided on said shell, and an indicator carried by said support cooperating with said graduations.

2. A device of the character described comprising a support, a gyroscope having its spin axis vertical, means mounting said gyroscope in said support for movement in any vertical plane, a spherical shell fixedly secured to said gyroscope and enclosing the same and having graduations thereon, and direct reading means on said support for automatically indicating in cooperation with the graduations on said shell in two dimensions the angular displacement of said shell relative to said support.

3. A device of the character described comprising a support, a pendulous gyroscope having its spin axis vertical, means mounting said gyroscope in said support for movement in any vertical plane, a spherical shell fixedly secured to said gyroscope and having graduations thereon, and direct reading means on said support cooperating with said graduations for automatically indicating in two dimensions the angular displacement of said shell relative to said support.

In witness whereof, I hereunto subscribe my name this 2nd day of April, A. D. 1918.

HELGE A. BORRESEN.